(12) United States Patent
Chan

(10) Patent No.: US 9,304,266 B2
(45) Date of Patent: Apr. 5, 2016

(54) OPTICAL COMMUNICATIONS MODULE HAVING AN OPTICAL PORT THAT PREVENTS RELATIVE MOVEMENT FROM OCCURRING BETWEEN THE OPTICAL PORT AND A FERRULE THAT IS MATED WITH THE OPTICAL PORT

(71) Applicant: Avago Technologies General IP (Singapore) Pte. Ltd., Singapore (SG)

(72) Inventor: Seng-Kum Chan, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 179 days.

(21) Appl. No.: 14/149,967

(22) Filed: Jan. 8, 2014

(65) Prior Publication Data

US 2015/0192746 A1    Jul. 9, 2015

(51) Int. Cl.
*G02B 6/42*    (2006.01)
*G02B 6/38*    (2006.01)

(52) U.S. Cl.
CPC .............. *G02B 6/421* (2013.01); *G02B 6/4292* (2013.01); *G02B 6/3897* (2013.01); *G02B 6/4248* (2013.01)

(58) Field of Classification Search
CPC . G02B 23/2423; G02B 6/3897; G02B 6/4248
See application file for complete search history.

(56) References Cited

U.S. PATENT DOCUMENTS

| | | | |
|---|---|---|---|
| 5,185,844 A * | 2/1993 | Bensel et al. | 385/135 |
| 8,985,869 B1 * | 3/2015 | Peng et al. | 385/88 |
| 2008/0019642 A1 * | 1/2008 | Kewitsch | 385/72 |
| 2010/0179385 A1 * | 7/2010 | Murata | 600/109 |
| 2011/0116757 A1 * | 5/2011 | Vanmeulen et al. | 385/135 |

FOREIGN PATENT DOCUMENTS

EP    1783522 A1    9/2007

OTHER PUBLICATIONS

Thorlabs—Multimedia SMA Patch Cables for Optogenetics, www.thorlabs.com website, Oct. 29, 2013.
Procedure of Fiber Cable Before Polishing, FiberStore.com website, Oct. 28, 2013, 7 pages.
LC Connector and LC Attenuator, Offical Blog of Fiberstore Inc. Optical Fiber Transmission Solution, Oct. 28, 2013, 15 pages.

* cited by examiner

*Primary Examiner* — Ryan Lepisto
*Assistant Examiner* — Mary A El Shammaa

(57) ABSTRACT

A plastic optical port of an optical communications module is equipped with an adapter having an inner diameter that adjusts to the outer diameter of a ferrule when the ferrule is mated with the optical port. In the mated configuration, the adapter creates an interference fit between the optical port and the ferrule that prevents or at least reduces relative movement between the optical port and the ferrule. Preventing or at least reducing relative movement between the ferrule and the optical port ensures that the distal end of the ferrule and the distal end of the fiber stub held within the port are maintained in precise optical alignment with one another. This, in turn, ensures high optical coupling efficiency for light being coupled between the distal end of the fiber stub and the distal end of the ferrule.

20 Claims, 12 Drawing Sheets

OPTICAL COMMUNICATIONS MODULE HAVING AN OPTICAL PORT THAT PREVENTS RELATIVE MOVEMENT FROM OCCURRING BETWEEN THE OPTICAL PORT AND A FERRULE THAT IS MATED WITH THE OPTICAL PORT

TECHNICAL FIELD OF THE INVENTION

The invention relates to optical communications modules. More particularly, the invention relates to an optical communications module having an optical port that is adapted to prevent relative movement from occurring between the optical port and a ferrule that is mated with the optical port.

BACKGROUND OF THE INVENTION

A variety of optical communications modules are used in optical networks for transmitting and receiving optical data signals over the networks. An optical communications module may be an optical receiver module that has optical receiving capability, but not optical transmitting capability. Alternatively, an optical communications module may be an optical transmitter module that has optical transmitting capability, but not optical receiving capability. Alternatively, an optical communications module may be an optical transceiver module that has both optical transmitting and optical receiving capability.

A typical optical transmitter or transceiver module has a transmitter optical subassembly (TOSA) that includes a laser driver circuit, at least one laser diode and various other electrical components. The laser driver circuit outputs an electrical drive signal to each respective laser diode to cause the respective laser diode to be modulated. When the laser diode is modulated, it outputs optical signals that have power levels corresponding to logic 1s and logic 0s. An optics system of the module focuses the optical signals produced by each respective laser diode into the end of a respective transmit optical fiber held within an optical connector module that connects to the optical transmitter or transceiver module.

A typical optical receiver or transceiver module has a receiver optical subassembly (ROSA) that includes at least one receive photodiode and various other electrical components. An optics system of the ROSA focuses an optical data signal that is output from the end of an optical fiber onto a photodiode of the ROSA. The photodiode converts the incoming optical data signal into an electrical analog signal. An electrical detection circuit, such as a transimpedance amplifier (TIA), receives the electrical signal produced by the photodiode and outputs a corresponding amplified electrical signal, which is processed by other circuitry of the ROSA to recover the data.

Many different types of optical communications modules are available in the market, including single-channel optical transmitter and receiver modules, dual-channel optical transceiver modules, and parallel optical transmitter, receiver and transceiver modules. One type of single-channel optical transmitter module has a tube-shaped plastic optical port that is sized and shaped to receive a ceramic ferrule of an optical connector module. A proximal end of the plastic optical port merges into a plastic module housing of the single-channel optical transmitter module. The distal end of the plastic optical port extends outwardly from the plastic module housing. The interior of the plastic module housing houses the electrical components and the light source of the transmitter module.

In order to prevent back reflection of light produced by the light source of this type of single-channel optical transmitter module, a fiber stub disposed inside of the plastic optical port has a proximal end that is secured to the light source or to a lens of the module by a refractive index matching (RIM) epoxy. The distal end of the fiber stub is centered in the plastic optical port such that when the ferrule of the optical connector module is mated with the plastic optical port, a distal end of the ferrule is in a mated arrangement with the distal end of the fiber stub. In this mated arrangement, a distal end of an optical fiber held within the ferrule is in precise alignment with the distal end of the fiber stub such that the cores of the optical fiber of the ferrule and of the fiber stub are in precise alignment with one another.

The mating of the distal end of the fiber stub with the distal end of the ferrule is very important. The mated arrangement should provide precise alignment of the fiber stub and the ferrule to ensure that all or nearly all of the light produced by the light source is coupled from the fiber stub into the ferrule. In order to maintain such precise alignment, there should be no relative movement between the fiber stub and the ferrule. Relative movement between the fiber stub and the ferrule can only be prevented by ensuring that the outer diameter of the ferrule is exactly equal to the inner diameter of the tube-shaped plastic optical port such that there is no air gap between the outer diameter of the ferrule and the inner diameter of the tube-shaped plastic optical port. Due to manufacturing tolerances, however, these plastic parts cannot be made with such precision. For that reason, there is almost always an air gap between the outer diameter of the ferrule and the inner diameter of the tube-shaped plastic optical port that allows relative movement between the ferrule and the port to occur.

Furthermore, due to these manufacturing tolerances, it is possible that a worst-case scenario will occur in which the outer diameter of the ferrule is at a minimum value and the inner diameter of the tube-shaped plastic optical port is at a maximum value. In such a worst-case scenario, a very large air gap will exist in between the outer surface of the ferrule and the inner surface of the tube-shaped plastic optical port, which can result in a large amount of relative movement between the ferrule and the port.

Because it is not currently possible to eliminate these manufacturing tolerances altogether, a need exists for a way to prevent or at least reduce relative movement between the optical port and the ferrule.

SUMMARY OF THE INVENTION

The invention is directed to an optical communications module and an adapter designed to be installed in a tube-shaped optical port of the module. When the ferrule of an optical connector module is mated with the optical port, the adapter prevents or at least reduces relative movement between the optical port and the ferrule.

In accordance with one illustrative embodiment, the adapter comprises a resilient tube having an adjustable inner diameter and an outer diameter. The adjustable inner diameter of the tube is smaller than an outer diameter of the ferrule. The outer diameter of the resilient tube is approximately equal to a first inner diameter of a first inner surface of the optical port such that when the resilient tube is disposed inside of the optical port, an outer surface of the resilient tube is in contact with the first inner surface of the optical port. The outer surface of the resilient tube is secured to the first inner surface of the optical port by an attachment material. When the ferrule is mated with the resilient tube, the inner diameter of the resilient tube stretches to be equal to the outer diameter of the ferrule such that an interference fit exists between the inner surface of the resilient tube and the outer surface of the ferrule that prevents or at least reduces relative movement between the optical port and the ferrule.

In accordance with another illustrative embodiment, the adapter comprises a resilient tube having an adjustable inner diameter and an outer diameter. The adjustable inner diameter of the tube is smaller than an outer diameter of the ferrule. The outer diameter of the resilient tube is approximately equal to an inner diameter of an inner surface of the optical port such that when the resilient tube is disposed inside of the optical port, an outer surface of the resilient tube is in contact with the inner surface of the optical port. The outer surface of the resilient tube is secured to the inner surface of the optical port by an attachment material. When the resilient tube is mated with the ferrule, the inner diameter of the resilient tube stretches to be equal to the outer diameter of the ferrule. The inner surface of the resilient tube comprises a bore of the optical port, and a portion of the inner surface of the resilient tube surrounds a portion of a fiber stub of the optical communications module such that the fiber stub is coaxially aligned with a longitudinal axis of the resilient tube.

In accordance with another illustrative embodiment, the adapter comprises a tube-shaped resilient sleeve and a resilient tube. The resilient sleeve has an inner surface and an outer surface having an original inner diameter and an original outer diameter, respectively. The sleeve has a split formed therein that allows the sleeve to be expanded by force from the original inner and outer sleeve diameters to enlarged inner and outer sleeve diameters, respectively. The sleeve is disposed in a first portion of the optical port defined by a first inner surface of the optical port and having a first inner port diameter. The original outer sleeve diameter is slightly smaller than the first inner port diameter and slightly smaller than an outer diameter of the ferrule. The resilient tube has an adjustable inner diameter and an outer diameter. The adjustable inner diameter of the resilient tube is smaller than the outer diameter of the ferrule. The resilient tube is disposed in a second portion of the optical port that is adjacent the first portion of the optical port such that an outer surface of the resilient tube is in contact with a second inner surface of the optical port having a second inner port diameter that is larger than the first inner port diameter. The outer surface of the resilient tube is secured to the second inner surface of the optical port by an attachment material.

When the ferrule is mated with the optical port, the outer surface of the ferrule is in contact with the inner surface of the resilient tube and with the inner surface of the sleeve and causes the inner diameter of the resilient tube to stretch to an enlarged inner diameter and causes the sleeve to be expanded to the enlarged inner and outer sleeve diameters. The outer surface of the expanded sleeve presses against the first inner surface of the optical port. An interference fit exists between the outer surface of the ferrule and the inner surfaces of the resilient tube and the resilient sleeve that prevents or at least reduces relative movement between the optical port and the ferrule.

These and other features and advantages of the invention will become apparent from the following description, drawings and claims.

DETAILED DESCRIPTION OF AN ILLUSTRATIVE EMBODIMENT

Figure 1:
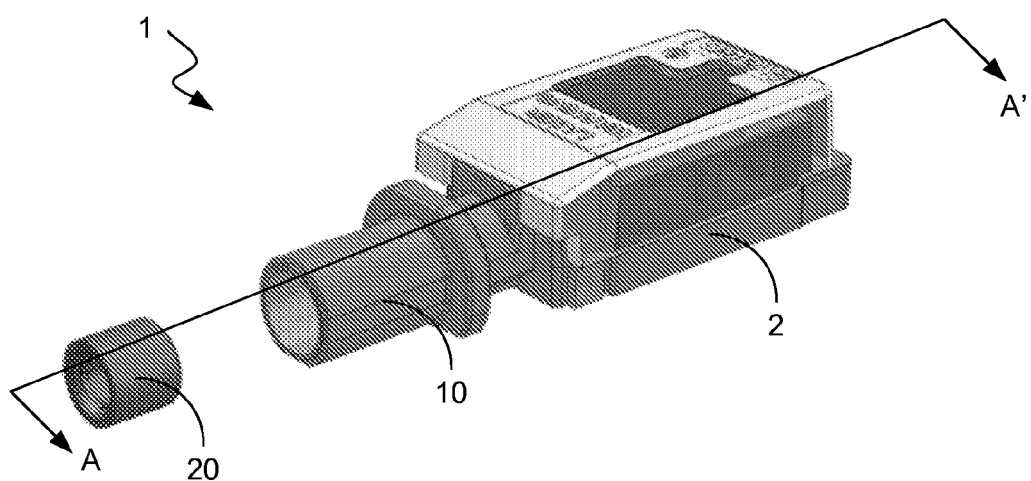
FIG. 1 illustrates a perspective view of an optical communications module and an adapter that is designed to be secured within a tube-shaped optical port of the optical communications module.

In accordance with embodiments of the invention, the plastic optical port of the optical communications module is equipped with an adapter having an inner diameter that adjusts to the outer diameter of the ferrule when the ferrule is inserted into and mated with the optical port. In the mated configuration, the adapter creates an interference fit between the optical port and the ferrule that prevents or at least reduces relative movement between the optical port and the ferrule. Preventing or at least reducing relative movement between the ferrule and the optical port ensures that the distal end of the ferrule and the distal end of the fiber stub held within the port are maintained in precise optical alignment with one another. This, in turn, ensures high optical coupling efficiency for light being coupled between the distal end of the fiber stub and the distal end of the ferrule.

The adapter can have a variety of configurations. A few illustrative, or exemplary, embodiments are described herein for the purposes of demonstrating the principles and concepts of the invention. Like reference numerals in the figures indicate like elements, components or features.

FIG. 1 illustrates a perspective view of an optical communications module 1 and an adapter 20 that is designed to be secured within a tube-shaped optical port 10 of the optical communications module 1. The module 1 has a module housing 2 that is typically made of a hard plastic material such as, for example, Ultem™ thermoplastic manufactured by Saudi Basic Industries Corporation (SABIC) of Saudi Arabia. The module housing 2, which includes the optical port 10, is typically, but not necessarily, a molded plastic part.

Figure 2:
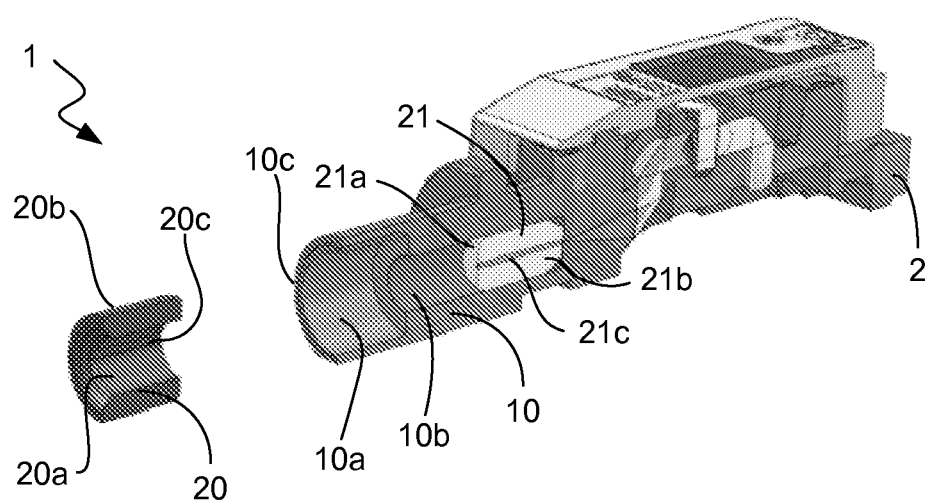
FIG. 2 illustrates a cross-sectional perspective view of the optical communications module and adapter shown in FIG. 1 taken along line A-A' of FIG. 1.
Figure 3:
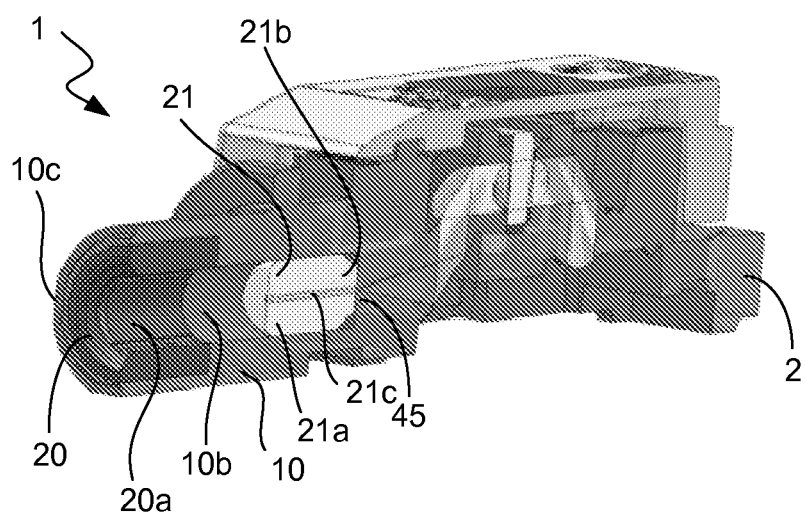
FIG. 3 illustrates a cross-sectional perspective view of the optical communications module shown in FIG. 1 taken along line A-A' with the adapter secured to an inner surface of the optical port of the module.
Figure 4:
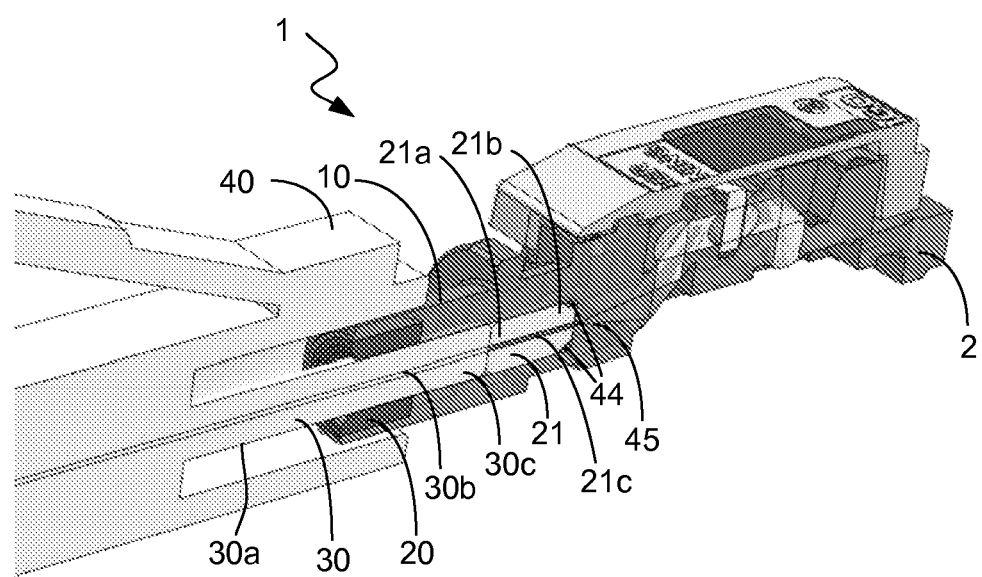
FIG. 4 illustrates a cross-sectional perspective view of the optical communications module shown in FIG. 3 with a ferrule of an optical connector module mated with the optical port of the optical communications module.

FIG. 2 illustrates a cross-sectional perspective view of the optical communications module 1 and adapter 20 shown in FIG. 1 taken along line A-A' of FIG. 1. FIG. 3 illustrates a cross-sectional perspective view of the optical communications module 1 shown in FIG. 1 taken along line A-A' with the adapter 20 secured to an inner surface of the optical port 10. FIG. 4 illustrates a cross-sectional perspective view of the optical communications module 1 shown in FIG. 3 with a ferrule 30 of an optical connector module 40 mated with the optical port 10. An illustrative embodiment of the optical communications module 1 and the adapter 20 will now be described with reference to FIGS. 1-4.

In accordance with this illustrative embodiment, the adapter comprises a resilient tube 20 having an inner surface 20a (FIG. 2) and an outer surface 20b (FIG. 2). The inner surface 20a defines an adjustable inner diameter of the adapter 20 and the outer surface 20b defines an outer diameter of the adapter 20. The optical port 10 has a first inner surface 10a (FIG. 2) and a second inner surface 10b (FIG. 2). The first inner surface 10a defines a first inner diameter of the optical port 10 and the second inner surface 10b defines a second inner diameter of the optical port 10 that is less than the first inner diameter of the optical port 10. The first inner diameter of the optical port 10 is approximately equal to the outer diameter of the resilient tube 20 such that when the tube 20 is inserted into a distal end 10c of the optical port 10 (FIG. 3), the outer surface 20b (FIG. 2) of the tube 20 is in contact with the first inner surface 10a (FIG. 2) of the optical port 10. The outer surface 20b of the tube 20 is fixedly secured to the first inner surface 10a of the optical port 10 by an attachment device or material such as epoxy (not shown), for example.

When the tube 20 is secured to the first inner surface 10a of the optical port 10 as shown in FIG. 3, the inner surface 20a of the tube 20 and the second inner surface 10b of the optical port 10 together comprise a bore of the optical port 10. In the assembled state of the module 1 shown in FIG. 3, the inner diameter of the tube 20 is slightly smaller than an outer diameter of the ferrule 30 (FIG. 4). The tube 20 is made of a resilient material such as rubber, for example, that allows the inner diameter of the tube 20 to be stretched in size to be equal to the outer diameter of the ferrule 30 when the ferrule 30 is mated with the optical port 10, as shown in FIG. 4. When the ferrule 30 is inserted into the optical port 10, the inner diameter of the tube 20 stretches due to the force exerted by the outer surface 30a of the ferrule 30 on the inner surface 20a of the tube 20. In the mated arrangement shown in FIG. 4, the outer surface 30a of the ferrule 30 is in an interference fit with the inner surface 20a (FIG. 3) of the tube 20.

With reference to FIG. 4, a fiber stub 21 is partially disposed inside of the optical port 10 such that a distal end 21a of the fiber stub 21 is surrounded by the second inner surface 10b (FIG. 3) of the optical port 10 and is precisely coaxially aligned therewith. A proximal end 21b (FIGS. 3 and 4) of the fiber stub 21 is secured by refractive index matching epoxy 44 to a lens system 45 (FIGS. 3 and 4) of the module 1. The interference fit that exists between the outer surface 30a of the ferrule 30 and the inner surface 20a (FIG. 3) of the tube 20 centers the ferrule 30 within the optical port 10 to ensure that an optical axis 30b (FIG. 4) of the ferrule 30 is maintained in precise coaxial alignment with an optical axis 21c (FIG. 4) of the fiber stub 21. The interference fit also helps prevent relative movement from occurring between the ferrule 30 and the optical port 10, which ensures high optical coupling efficiency of light being coupled from the distal end 21a (FIG. 4) of the fiber stub 21 into a distal end 30c (FIG. 4) of the ferrule 30 (FIG. 4).

The tube 20 may be made of resilient materials other than rubber, such as, for example, silicone, neoprene, or any other material that has the desired characteristics of elasticity. In other words, the tube 20 may be made of any material that allows the inner surface 20a of the tube 20 to be stretched from its original diameter to its enlarged diameter while also attempting to return the inner surface 20a of the tube 20 to its original shape. As the inner surface 20a of the tube 20 attempts to return to its original shape, a force is exerted by the inner surface 20a of the tube 20 on the outer surface 30a of the ferrule 30 that prevents or at least lessens relative movement between the port 10 and the ferrule 30 and forces the ferrule 30 into optical alignment with the fiber stub 21.

With reference again to FIG. 2, the tube 20 has one or more grooves 20c formed in the inner surface 20a of the tube 20 from one end of the tube 20 to the opposite end of the tube 20. When the ferrule 30 is inserted into the tube 20, air may be trapped in between the tube 20 and the ferrule 30 (FIG. 4). If the trapped air is not released, it may push the ferrule 30 partially back out of the tube 20, which is a phenomenon known as pistoning. The grooves 20c act as air passageways between the tube 20 and the ferrule 30 that allow air to escape from the port 10 so that pistoning does not occur.

Figure 5:
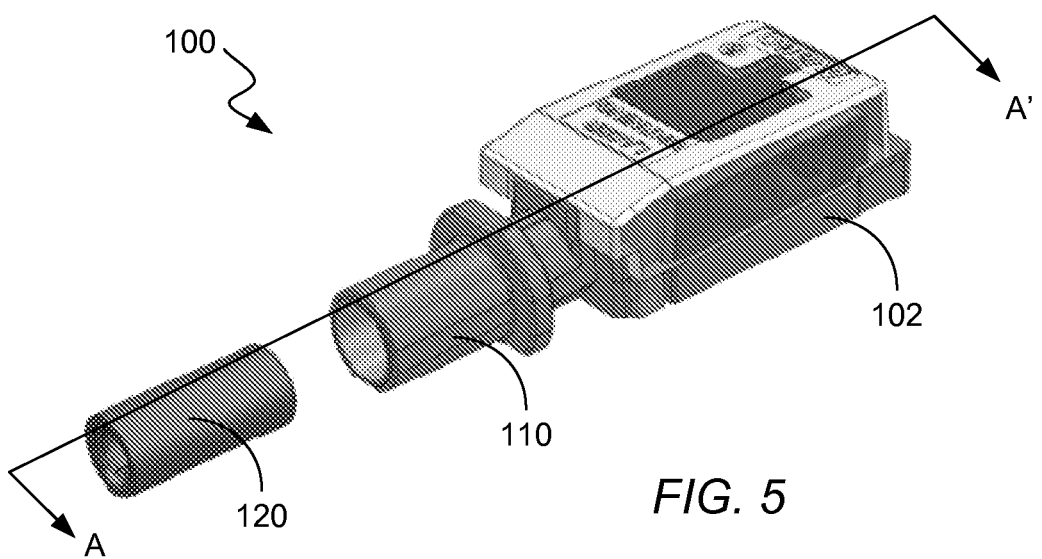
FIG. 5 illustrates a perspective view of an optical communications module and an adapter that is designed to be secured within a tube-shaped optical port of the optical communications module.
Figure 6:
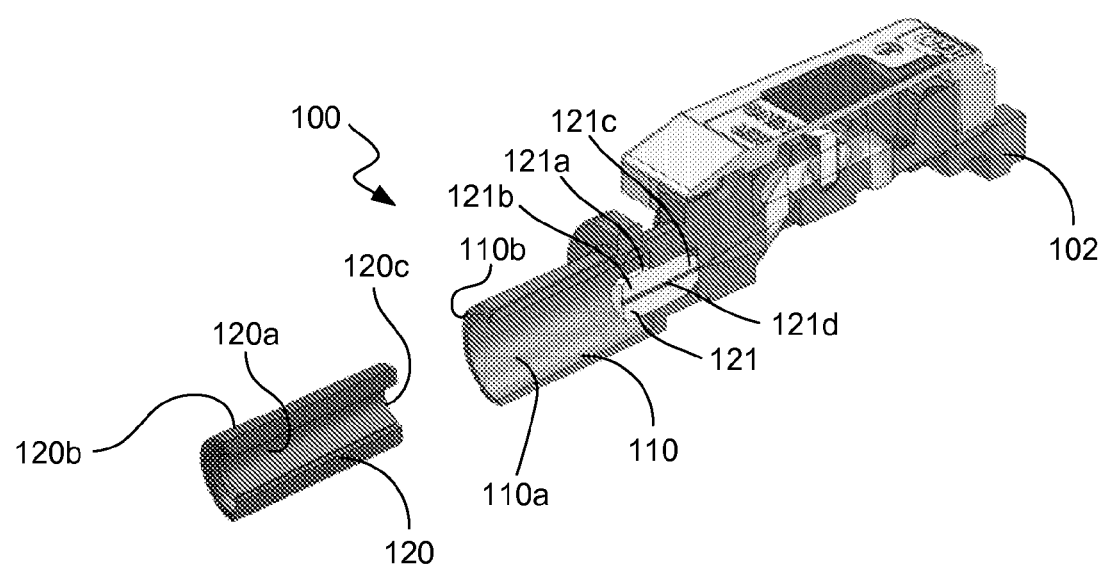
FIG. 6 illustrates a cross-sectional perspective view of the optical communications module and adapter shown in FIG. 5 taken along line A-A' of FIG. 5.
Figure 7:
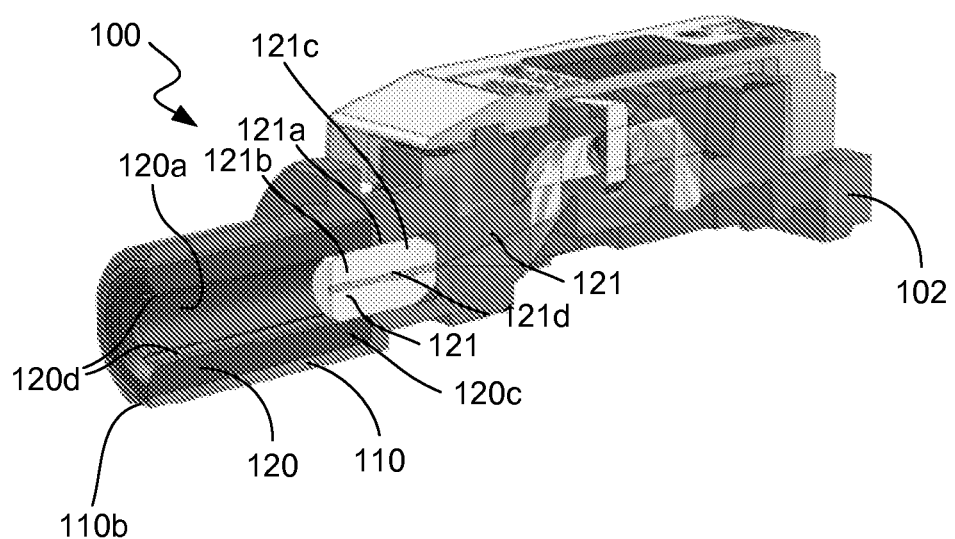
FIG. 7 illustrates a cross-sectional perspective view of the optical communications module shown in FIG. 5 taken along line A-A' with the adapter secured to an inner surface of the optical port of the module.
Figure 8:
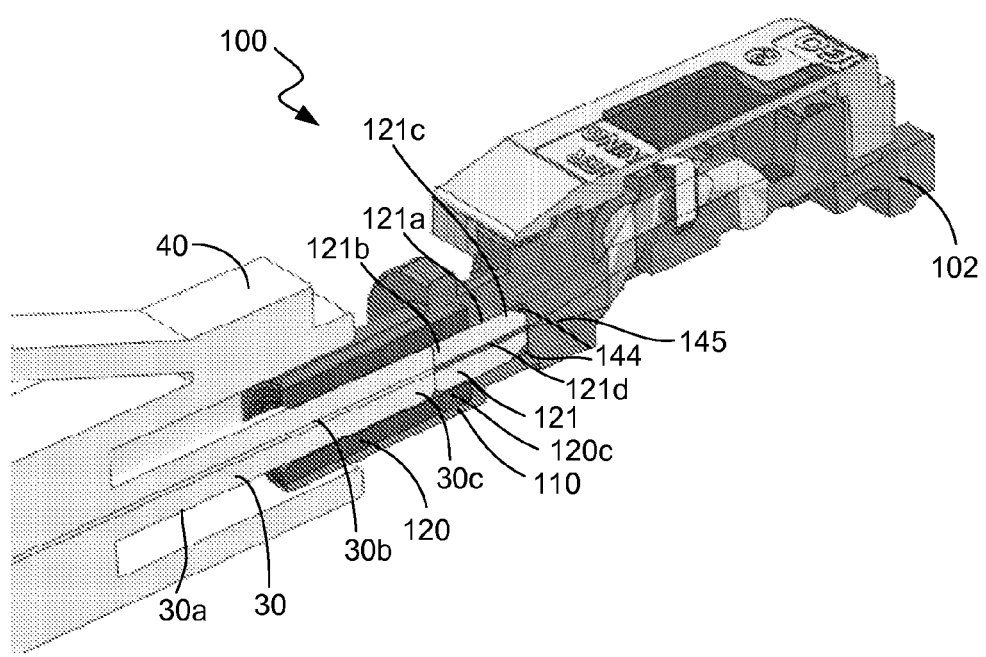
FIG. 8 illustrates a cross-sectional perspective view of the optical communications module shown in FIG. 7 with a ferrule of an optical connector module mated with the optical port of the optical communications module.

FIG. 5 illustrates a perspective view of an optical communications module 100 and an adapter 120, which is designed to be secured within a tube-shaped optical port 110 of the optical communications module 100. The module 100 has a module housing 102 that is typically made of a hard plastic material such as, for example, Ultem™ thermoplastic. The module housing 102, which includes the optical port 110, is typically, but not necessarily, a molded plastic part. FIG. 6 illustrates a cross-sectional perspective view of the optical communications module 100 and adapter 120 shown in FIG. 5 taken along line A-A' of FIG. 5. FIG. 7 illustrates a cross-sectional perspective view of the optical communications module 100 shown in FIG. 5 taken along line A-A' with the adapter 120 secured to an inner surface of the optical port 110. FIG. 8 illustrates a cross-sectional perspective view of the optical communications module 100 shown in FIG. 7 with the ferrule 30 of the optical connector module 40 shown in FIG. 4 mated with the optical port 110 of the module 100. Another illustrative embodiment will now be described with reference to FIGS. 5-8.

In accordance with this illustrative embodiment, the adapter comprises a resilient tube 120 (FIG. 5) having an inner surface 120a (FIG. 6) and an outer surface 120b (FIG. 6). The inner surface 120a defines an adjustable inner diameter of the adapter 120 and the outer surface 120b defines an outer diameter of the adapter 120. With reference to FIG. 6, the optical port 110 has an inner surface 110a that defines an inner diameter of the optical port 110. The inner diameter D3 of the optical port 110 is equal to or approximately equal to the outer diameter D2 of the resilient tube 120. When the tube 120 is inserted into a distal end 110b (FIGS. 6 and 7) of the optical port 110, the outer surface 120b (FIG. 6) of the tube 120 is in contact with the inner surface 110a (FIG. 6) of the optical port 110. The outer surface 120b of the tube 120 is fixedly secured to the inner surface 110a of the optical port 110 by an attachment device or material such as epoxy, for example.

When the tube 120 is secured to the optical port 110 as shown in FIG. 7, a proximal end 120c of the tube 120 surrounds an outer surface 121a of a portion of a fiber stub 121 of the module 100. In accordance with this illustrative embodiment, the fiber stub 121 has an outer diameter that is equal to the inner diameter of the tube 120 such that a circumferential portion of the outer surface 121a of the fiber stub 121 is in contact with a circumferential portion of the inner surface 120a of the tube 120. The inner surface 120a of the tube 120 acts as a bore of the optical port 110. In the assembled state of the module 100 shown in FIG. 8, the inner diameter of the tube 120 is slightly smaller than the outer diameter of the ferrule 30. The tube 120 is made of a resilient material such as rubber that allows the inner diameter of the tube 120 to increase in size to be equal to the outer diameter of the ferrule 30 when the ferrule 30 is mated with the optical port 110 as shown in FIG. 8. When the ferrule 30 is inserted into the optical port 110, the inner diameter of the tube 120 stretches due to the force exerted by the outer surface 30a of the ferrule 30 on the inner surface 120a of the tube 120. In the mated arrangement shown in FIG. 8, the outer surface 30a of the ferrule 30 is in an interference fit with the inner surface 120a of the tube 120.

With reference to FIG. 8, the interference fit that exists between the outer surface 30a of the ferrule 30 and the inner surface 120a (FIG. 7) of the tube 120 and the contact between the outer surface 121a (FIG. 8) of the fiber stub 121 and the inner surface 120a (FIG. 7) of the tube 120 ensure that the optical axis 30b (FIG. 8) of the ferrule 30 is maintained in precise alignment with an optical axis 121d (FIG. 8) of the fiber stub 121 and that there is no relative movement between the port 110 and the ferrule 30. These features ensure that there is high optical coupling efficiency of light coupled from the distal end 121b (FIG. 8) of the fiber stub 121 into the distal end 30c (FIG. 8) of the ferrule 30. The proximal end 121c of the fiber stub 121 is secured by refractive index matching epoxy 144 to a lens system 145 of the module 100.

Like the tube 20 shown in FIGS. 1-4, the tube 120 shown in FIGS. 5-8 may be made of rubber or other resilient materials, such as, for example, silicone, neoprene, or any other material that allows the inner diameter of the tube 120 to be stretched to the size of the diameter of the ferrule 30 while attempting to return to its original shape.

With reference again to FIG. 7, the tube 120 has one or more grooves 120d formed in the inner surface 120a of the tube 120 from one end of the tube 120 to the opposite end of the tube 120. The grooves 120d act as air passageways between the tube 120 and the ferrule 30 that allow air to escape from the port 110 so that pistoning of the ferrule 30 relative to the tube 120 does not occur.

Figure 9:
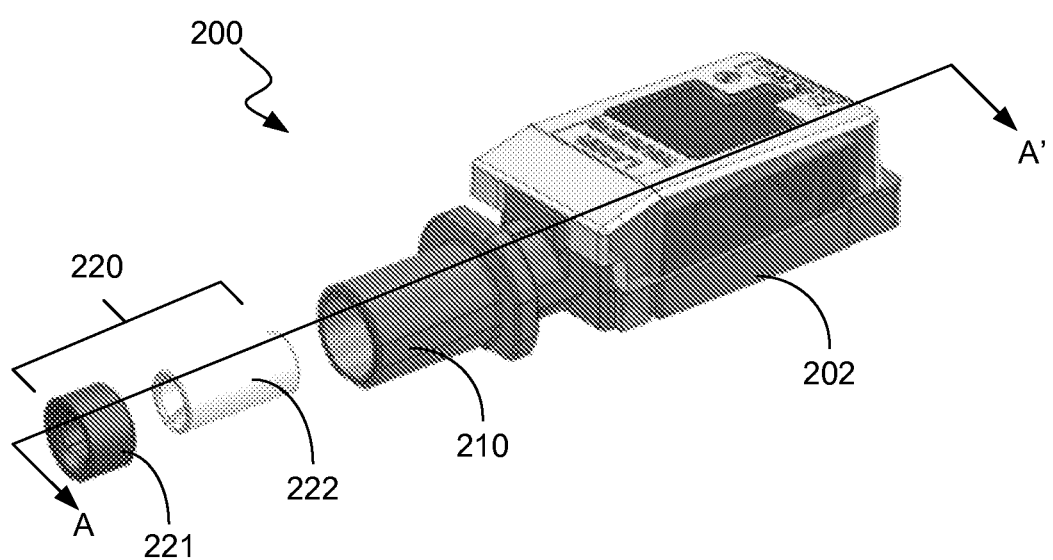
FIG. 9 illustrates a perspective view of an optical communications module and an adapter that is designed to be secured within a tube-shaped optical port of the optical communications module.
Figure 10:
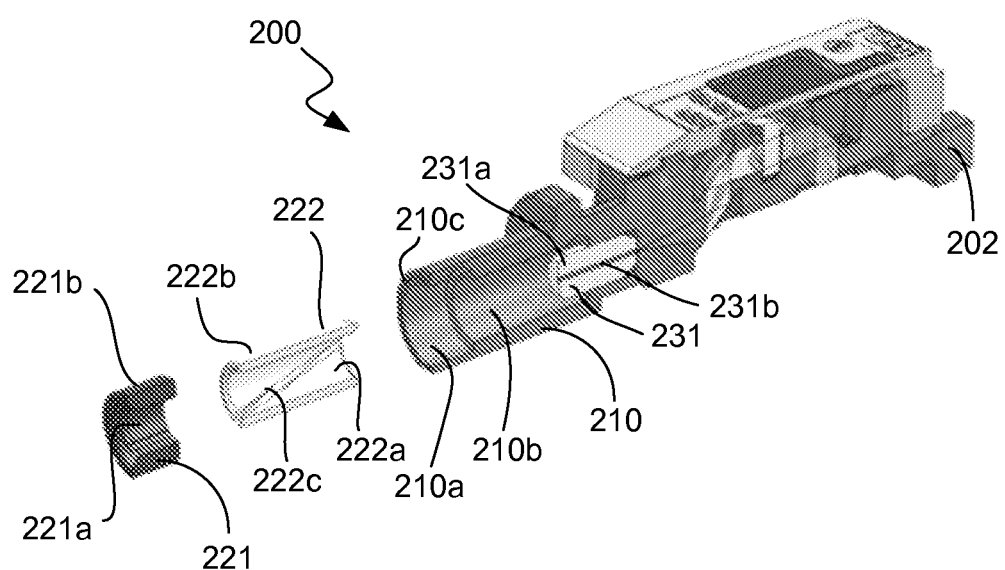
FIG. 10 illustrates a cross-sectional perspective view of the optical communications module and adapter shown in FIG. 9 taken along line A-A' of FIG. 9.
Figure 11:
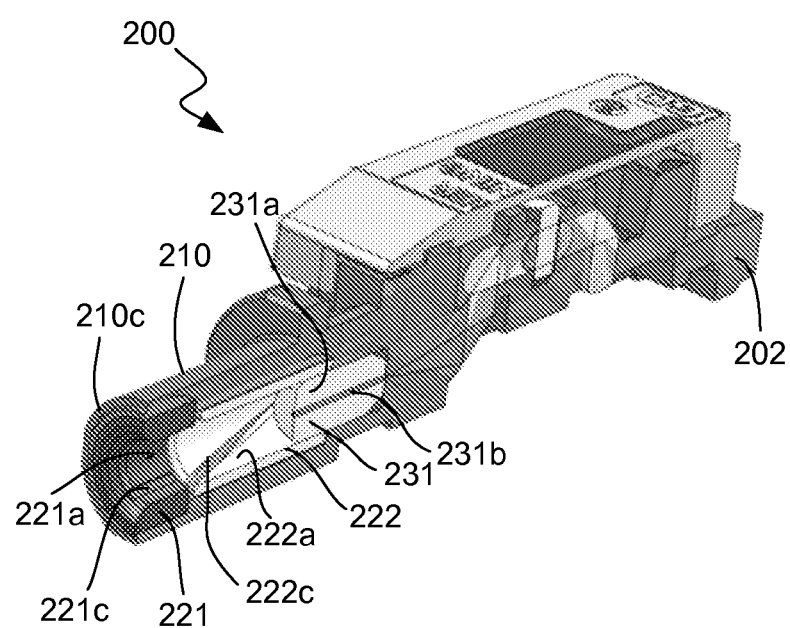
FIG. 11 illustrates a cross-sectional perspective view of the optical communications module shown in FIG. 9 taken along line A-A' with the adapter secured to an inner surface of the optical port of the module.
Figure 12:
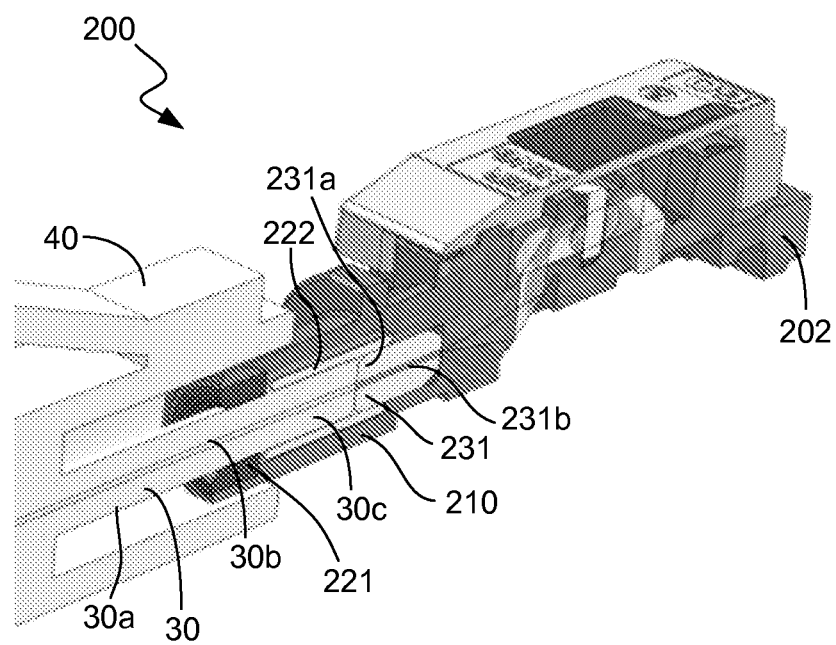
FIG. 12 illustrates a cross-sectional perspective view of the optical communications module shown in FIG. 11 with a ferrule of an optical connector module mated with the optical port of the optical communications module.

FIG. 9 illustrates a perspective view of an optical communications module 200 and an adapter 220 in accordance with another illustrative embodiment. The adapter 220 is designed to be secured within a tube-shaped optical port 210 of the module 200. The module 200 has a module housing 202 that is typically made of a hard plastic material such as, for example, Ultem™ thermoplastic. The module housing 102, which includes the optical port 210, is typically, but not necessarily, a molded plastic part. FIG. 10 illustrates a cross-sectional perspective view of the optical communications module 200 and adapter 20 shown in FIG. 9 taken along line A-A' of FIG. 9. FIG. 11 illustrates a cross-sectional perspective view of the optical communications module 200 shown in FIG. 9 taken along line A-A' with the adapter 220 secured to an inner surface of the optical port 210. FIG. 12 illustrates a cross-sectional perspective view of the optical communications module 200 shown in FIG. 11 with the ferrule 30 of the optical connector module 40 shown in FIG. 4 mated with the optical port 210. The optical communications module 200 and the adapter 220 in accordance with this illustrative embodiment will now be described with reference to FIGS. 9-12.

In accordance with this illustrative embodiment, the adapter 220 is a two-part assembly comprising a resilient tube 221 and a tube-shaped sleeve 222. The resilient tube 221 has an inner surface 221a (FIG. 10) and an outer surface 221b (FIG. 10). The sleeve 222 has an inner surface 222a (FIG. 10), an outer surface 222b (FIG. 10) and a slit 222c (FIG. 10). The sleeve 222 is typically made of a ceramic material, but may be made of other materials having suitable characteristics of resilience that allow the sleeve 222 to be deformed from original inner and outer diameters to enlarged inner and outer diameters while attempting to return to its non-deformed original shape. For example, the sleeve 222 may be made of a metallic material, such as steel, for example. One known ceramic material that is suitable for making the sleeve 222 is zirconia. Such ceramic sleeves with slits are widely available in the market with various dimensions. The slit 222c allows the sleeve 222 to be deformed from an original inner diameter to an enlarged inner diameter and from an original outer diameter to an enlarged outer diameter. As will be described below in more detail, the original inner diameter of the sleeve 222 is slightly smaller than the outer diameter of the ferrule 30 such that when the ferrule 30 is received in the sleeve 222, the sleeve 222 expands outwardly from its original inner/outer diameters to its enlarged inner/outer diameters.

The inner surface 221a (FIGS. 10 and 11) of the resilient tube 221 defines an adjustable inner diameter of the tube 221 and the outer surface 221b (FIGS. 10 and 11) defines an outer diameter of the tube 221. The optical port 210 has a first inner surface 210a (FIG. 10) and a second inner surface 210b (FIG. 10). The first inner surface 210a defines a first inner diameter of the optical port 210 and the second inner surface 210b defines a second inner diameter of the optical port 210, where the first inner diameter is greater than the second inner diameter. The first inner diameter of the optical port 210 is approximately equal to the outer diameter of the resilient tube 221 such that when the tube 221 is inserted into a distal end 210c of the optical port 210 (FIG. 11), the outer surface 221b (FIG. 10) of the tube 221 is in contact with the first inner surface 210a (FIG. 10) of the optical port 210. The tube 221 is not inserted into the optical port 210 until after the sleeve 222 has been installed in the optical port 210, as will now be described.

The original outer diameter of the sleeve 222 is slightly smaller than the second inner diameter of the optical port 210. This allows the sleeve 222 to have some freedom of movement within the optical port 210 after it is installed (FIG. 11). After the sleeve 222 has been installed in the optical port 210, the tube 221 is inserted into the optical port 210 (FIG. 11). The outer surface 221b of the tube 221 is fixedly secured to the first inner surface 210a of the optical port 210 by an attachment device or material such as epoxy (not shown), for example. When the tube 221 is secured to the first inner surface 210a of the optical port 210 as shown in FIG. 11, the inner surface 221a of the tube 221 and the inner surface 222a of the sleeve 222 together comprise a bore of the optical port 210. Once the tube 221 is secured in place, it prevents the sleeve 222 from coming out of the port 210.

In the assembled state of the module 200 shown in FIG. 11, the inner diameter of the tube 221 and the original inner diameter of the sleeve 222 are slightly smaller than the outer diameter of the ferrule 30. The tube 221 is made of a resilient material such as rubber, for example, that allows the inner diameter of the tube 221 to increase in size to be equal to the outer diameter of the ferrule 30 when the ferrule 30 is mated with the optical port 210 (FIG. 12). The slit 222c formed in the sleeve 222 allows the inner diameter of the sleeve 222 to increase in size to be equal to the outer diameter of the ferrule 30 when the ferrule 30 is mated with the optical port 210 (FIG. 12). When the ferrule 30 is inserted into the optical port 10, the inner diameter of the tube 221 stretches due to the force exerted by the outer surface 30a of the ferrule 30 on the inner surface 221a of the tube 221. Likewise, the force exerted by the outer surface 30a of the ferrule 30 on the inner surface 222a of the sleeve 222 causes the sleeve 222 to expand outwardly from its original inner/outer diameters to its enlarged inner/outer diameters. In the mated arrangement shown in FIG. 12, the outer surface 30a of the ferrule 30 is in an interference fit with the inner surface 221a of the tube 221 and with the inner surface 222a of the sleeve 222.

In this mated arrangement, the sleeve 222 acts as an aligner between the fiber stub 231 and the ferrule 30. A distal portion 231a (FIGS. 11 and 12) of the fiber stub 231 is surrounded by the sleeve 222. Thus, the sleeve 222 surrounds portions of both the ferrule 30 and the fiber stub 231 (FIG. 12). The combination of the sleeve 222 and the tube 221 prevent relative movement from occurring between the optical port 210 and the ferrule 30 so that the optical axis 231b of the fiber stub 231 and the optical axis 30b (FIG. 12) of the ferrule 30 remain in coaxial alignment with one another.

Due to the sleeve 222 being made of a ceramic material, the sleeve 222 is capable of being manufactured with extremely tight tolerances. Metal sleeves are also capable of being manufactured with extremely tight tolerances. The sleeve 222 effectively removes any air gap that might otherwise exist in between the outer surface 30a of the ferrule 30 and the second inner surface 210b of the optical port 210 by expanding to whatever diameter is needed depending on the difference between the second inner diameter of the optical port 210 and the outer diameter of the ferrule 30. The smaller the difference between the second inner diameter of the optical port 210 and the outer diameter of the ferrule 30, the more the sleeve 222 will expand, and vice versa.

With reference again to FIG. 11, the tube 221 has one or more grooves 221c formed in the inner surface 221a of the tube 221 from one end of the tube 221 to the opposite end of the tube 221. The grooves 221c act as air passageways between the tube 221 and the ferrule 30 that allow air to escape from the port 210 so that pistoning of the ferrule 30 relative to the tube 221 does not occur.

It can be seen from the illustrative embodiments provided above that the adapter prevents, or at least reduces, the occurrence of relative movement between the optical port and the ferrule, which results in better alignment being maintained between the optical axes of the fiber stub and the ferrule. It can also be seen from these illustrative embodiments that the adapter urges the ferrule into coaxial alignment with the fiber stub. The result is that better coaxial alignment is maintained between the fiber stub and the ferrule, which results in more efficient coupling of light between the fiber stub and the ferrule.

It should be noted that the adapter has been described with reference to a few illustrative embodiments for the purposes of demonstrating the principles and concepts of the invention. The adapter, however, is not limited to these designs. Those of skill in the art will recognize that the principles and concepts of the invention apply equally to other adapter designs not described herein. The principles and concepts of the invention also apply to other types of optical communications modules than those explicitly described herein, as will also be recognized by those of skill in the art in view of the description being provided herein. Many modifications may be made to the illustrative embodiments described herein without deviating from the scope of the invention. Persons skilled in the art will understand, in view of the description provided herein, that all such modifications are within the scope of the invention.

What is claimed is:

1. An optical communications module comprising:
   a module housing including a tube-shaped optical port adapted to receive a ferrule; and
   a resilient tube disposed inside of the tube-shaped optical port, the resilient tube having an adjustable inner diameter that is smaller than an outer diameter of the ferrule and an outer diameter that is approximately equal to a first inner diameter of a first inner surface of the optical port such that when the resilient tube is disposed inside of the optical port, an outer surface of the resilient tube is in contact with the first inner surface of the optical port, and wherein when the ferrule is mated with the resilient tube, the adjustable inner diameter of the resilient tube stretches to be equal to the outer diameter of the ferrule to form a first interference fit between an inner surface of the resilient tube and an outer surface of the ferrule, which reduces or eliminates relative movement between the ferrule and the optical port.

2. The optical communications module of claim 1, wherein the outer surface of the resilient tube is secured to the first inner surface of the optical port by an attachment material.

3. The optical communications module of claim 1, wherein the optical port has a second inner surface having a second inner diameter that is approximately equal to the outer diameter of the ferrule, and wherein the inner surface of the resilient tube and the second inner surface of the optical port comprise a bore of the optical port that surrounds the ferrule when the ferrule is mated with the resilient tube.

4. The optical communications module of claim 1, wherein the resilient tube is made of an elastic material.

5. The optical communications module of claim 4, wherein the elastic material is rubber.

6. The optical communications module of claim 4, wherein the elastic material is neoprene.

7. The optical communications module of claim 4, wherein the elastic material comprises silicone.

8. The optical communications module of claim 4, wherein the optical port is made of plastic.

9. The optical communications module of claim 3, further comprising:
   a fiber stub, wherein a distal end of the fiber stub is disposed inside of the optical port, the fiber stub having an optical axis that is coaxially aligned with an optical axis of the optical port, and wherein the first interference fit between the outer surface of the ferrule and the inner surface of the resilient tube urges the ferrule into alignment with the fiber stub such that an optical axis of the ferrule is aligned with the optical axis of the fiber stub.

10. The optical communications module of claim 1, wherein the resilient tube has one or more grooves formed in the inner surface of the tube from one end of the tube to an opposite end of the tube, and wherein the grooves act as air passageways between the tube and the ferrule that allow air to escape from the optical port so that pistoning of the ferrule relative to the tube does not occur.

11. The optical communications module of claim 1, wherein the inner surface of the resilient tube further surrounds a portion of a fiber stub of the optical communications module such that the fiber stub is coaxially aligned with a longitudinal axis of the resilient tube.

12. The optical communications module of claim 11, wherein the first interference fit reduces or eliminates relative movement between the ferrule and the optical port and urges the ferrule into alignment with the fiber stub such that an optical axis of the ferrule is aligned with an optical axis of the fiber stub.

13. The optical communications module of claim 11, wherein the resilient tube has one or more grooves formed in the inner surface of the tube from one end of the tube to an opposite end of the tube, and wherein the grooves act as air passageways between the tube and the fiber stub that allow air to escape from the optical port so that pistoning of the fiber stub relative to the tube does not occur.

14. The optical communications module of claim 1, further comprising:
   a resilient sleeve having a split formed therein that allows the resilient sleeve to be expanded by force when the ferrule is mated with the resilient sleeve, and wherein an inner diameter of the resilient sleeve is slightly smaller than the outer diameter of the ferrule such that a second interference fit exists between the outer diameter of the ferrule and the inner diameter of the resilient sleeve when the ferrule is mated with the resilient sleeve.

15. The optical communications module of claim 14, wherein the resilient sleeve is made of at least one a ceramic material or a metallic material.

16. The optical communications module of claim 15, wherein the ceramic material is zirconia.

17. The optical communications module of claim 15, wherein the metallic material is steel.

18. The optical communications module of claim 14, further comprising:
   a fiber stub, wherein a distal end of the fiber stub is disposed inside of the optical port and is surrounded by the resilient sleeve, the fiber stub having an optical axis that is coaxially aligned with an optical axis of the optical port, and wherein the first interference fit between the outer surface of the ferrule and the inner surface of the resilient tube and the second interference fit between the inner surface of the resilient sleeve and the outer surface of the ferrule urge the ferrule into alignment with the fiber stub such that an optical axis of the ferrule is aligned with the optical axis of the fiber stub.

19. An optical communications module comprising:
   a module housing including an optical port adapted to receive a ferrule; and
   a sleeve disposed inside of the optical port, the sleeve having a split formed therein that allows the sleeve to be expanded by force when the ferrule is mated with the sleeve, a deformable inner diameter of the sleeve being slightly smaller than an outer diameter of the ferrule such that a first interference fit exists between at least a portion of an outer surface of the ferrule and at least a portion of an inner surface of the sleeve when the ferrule is mated with the sleeve, the first interference fit reducing or eliminating relative movement between the ferrule and the optical port.

20. The optical communications module of claim 19, further comprising:
   a resilient tube disposed inside the optical port, the resilient tube having an adjustable inner diameter that is smaller than the outer diameter of the ferrule and an outer diameter that is approximately equal to an inner diameter of the optical port such that when the resilient tube is disposed inside of the optical port, at least a portion of an outer surface of the resilient tube is in contact with the at least a portion of an inner surface of the optical port, and wherein when the ferrule is mated with the resilient tube, the adjustable inner diameter of the resilient tube stretches to be equal to the outer diameter of the ferrule to form a second interference fit between at least a portion of an inner surface of the resilient tube and another portion of the outer surface of the ferrule, which further reduces or eliminates relative movement between the ferrule and the optical port.

* * * * *